(12) United States Patent
Park et al.

(10) Patent No.: US 9,359,696 B2
(45) Date of Patent: Jun. 7, 2016

(54) METHOD FOR MANUFACTURING POLY(ETHYLENETEREPHTHALATE) DRAWN FIBER, POLY(ETHYLENETEREPHTHALATE) DRAWN FIBER AND TIRE-CORD

(71) Applicant: KOLON INDUSTRIES, INC., Gwacheon-si, Gyeonggi-do (KR)

(72) Inventors: Sung-Ho Park, Yongin-si (KR); Il Chung, Yongin-si (KR); Gi-Woong Kim, Yongin-si (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 0 days.

(21) Appl. No.: 14/233,438

(22) PCT Filed: Sep. 25, 2012

(86) PCT No.: PCT/KR2012/007709
§ 371 (c)(1),
(2) Date: Jan. 17, 2014

(87) PCT Pub. No.: WO2013/048086
PCT Pub. Date: Apr. 4, 2013

(65) Prior Publication Data
US 2015/0211150 A1    Jul. 30, 2015

(30) Foreign Application Priority Data

Sep. 27, 2011 (KR) .......................... 10-2011-0097692

(51) Int. Cl.
| | | |
|---|---|---|
| *D01D 5/08* | (2006.01) |
| *D02G 3/48* | (2006.01) |
| *D02J 1/22* | (2006.01) |
| *D01F 6/60* | (2006.01) |
| *D01D 5/12* | (2006.01) |
| *D01F 6/62* | (2006.01) |
| *B60C 9/00* | (2006.01) |
| *D01D 5/098* | (2006.01) |
| *D01D 10/02* | (2006.01) |

(52) U.S. Cl.
CPC ............. *D01F 6/60* (2013.01); *B60C 9/0042* (2013.04); *D01D 5/08* (2013.01); *D01D 5/098* (2013.01); *D01D 5/12* (2013.01); *D01D 10/02* (2013.01); *D01F 6/62* (2013.01); *D02G 3/48* (2013.01); *D02J 1/22* (2013.01); *D10B 2331/04* (2013.01)

(58) Field of Classification Search
None
See application file for complete search history.

(56) References Cited

U.S. PATENT DOCUMENTS

| | | | |
|---|---|---|---|
| 4,373,797 | A | 2/1983 | Shimada et al. |
| 4,491,657 | A | 1/1985 | Saito et al. |
| 5,067,538 | A | 11/1991 | Nelson et al. |
| 9,005,754 | B2 | 4/2015 | Chung et al. |
| 2010/0154957 | A1 | 6/2010 | Jeon et al. |

FOREIGN PATENT DOCUMENTS

| | | |
|---|---|---|
| CN | 1043760 A | 9/1990 |
| CN | 1266465 A | 9/2000 |
| CN | 1247834 C | 3/2006 |
| CN | 1844506 A | 10/2006 |
| CN | 101680135 A | 3/2010 |
| CN | 101978104 A | 2/2011 |
| EP | 0154425 A2 | 9/1985 |
| EP | 0374356 A2 | 6/1990 |
| JP | 59001719 A | 1/1984 |
| JP | 60209015 A | 10/1985 |
| JP | 10-25618 A | 1/1998 |
| JP | 2907912 B2 | 6/1999 |
| JP | 2000-273721 A | 10/2000 |
| KR | 10-1022336 B1 | 3/2011 |
| WO | 90/04667 A1 | 5/1990 |

OTHER PUBLICATIONS

European Patent Office, Communication dated May 8, 2015 issued in corresponding European application No. 12837107.7.

*Primary Examiner* — Ana Woodward
(74) *Attorney, Agent, or Firm* — Sughrue Mion, PLLC

(57) ABSTRACT

Disclosed are a method for manufacturing a drawn fiber, which is suitable for manufacturing a poly(ethylene terephthalate) drawn fiber showing superior strength and dimensional stability and having a high fineness of 2000 denier or more without breakage or reduction in physical properties during the manufacturing process, and a poly(ethylene terephthalate) drawn fiber and a tire-cord obtained therefrom.

3 Claims, 1 Drawing Sheet

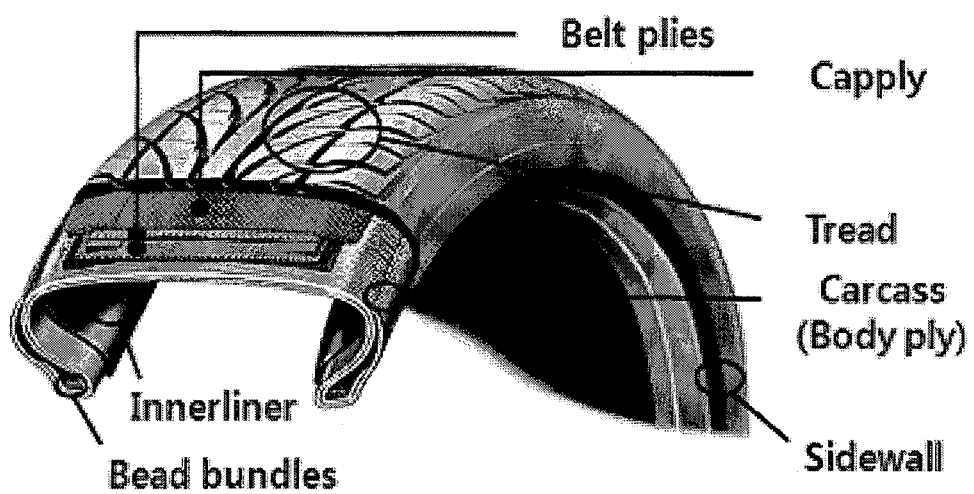

METHOD FOR MANUFACTURING POLY(ETHYLENETEREPHTHALATE) DRAWN FIBER, POLY(ETHYLENETEREPHTHALATE) DRAWN FIBER AND TIRE-CORD

CROSS REFERENCE TO RELATED APPLICATIONS

This application is a National Stage of International Application No. PCT/KR2012/007709 filed Sep. 25, 2012, claiming priority based on Korean Patent Application No. 10-2011-0097692, filed Sep. 27, 2011, the contents of all of which are incorporated herein by reference in their entirety.

TECHNICAL FIELD

The present invention relates to a method for manufacturing a drawn fiber, which is able to manufacture a high strength poly(ethylene terephthalate) drawn fiber showing superior strength and dimensional stability and having a high fineness of 2000 denier or more without breakage or deterioration in physical properties during the manufacturing process, and a poly(ethylene terephthalate) drawn fiber and a tire-cord obtained therefrom.

BACKGROUND ART

A tire is a complex body of fiber/steel/rubber, and generally has a structure as illustrated in FIG. 1. Herein, body ply is, also called carcass, a reinforcing cord layer inside the tire, and supports the entire load of vehicle, maintains the tire shape, and withstands against a shock, and is required to have high fatigue resistance against bending and stretching movement during driving.

A polyester synthetic fiber such as polynaphthalene terephthalate is generally applied to the body ply, that is, tire-cord.

The synthetic fiber cord has high tenacity to greatly contribute to the durability improvement of tire. However, it has a disadvantage of reducing elasticity and dimensional stability of the tire after curing process due to its high heat shrinkage ratio. In order to make up for this disadvantage, many studies have been made to improve dimensional stability of the cord through an additional process such as PCI (Post Cure Inflation). In particular, high tenacity fibers for industrial applications are able to show high strength by increasing a drawing ratio at a low speed. However, they still have high heat shrinkage ratio and low elasticity, and thus the PCI process is required.

Subsequently, an ultra high-speed spinning technique was employed in the manufacturing process of tire-cord, and thus it is possible to manufacture a polyester tire-cord having high modulus low shrinkage (HMLS) properties without the PCI process.

In order to manufacture the tire-cord having high modulus low shrinkage (HMLS) properties, an undrawn fiber having high crystallinity should be used. Since the undrawn fiber having high crystallinity has a relatively narrow region to be drawn, non-uniform drawing or breakage due to friction easily occurs when the undrawn fiber is drawn at a ultra-high speed and a high drawing ratio using a ultra high-speed spinning equipment.

For this reason, there is a limitation in the drawing ratio of the undrawn fiber having high crystallinity when applied to the ultra high-speed spinning equipment, and sufficient drawing cannot be given to the fiber, resulting in a great reduction in tensile strength of the drawn fiber. In particular, it is more difficult to secure a sufficient distance between holes in the spinneret and uniform cooling during the manufacturing process of the drawn fiber having a high fineness of 2000 denier or more and the tire-cord, and thus a great reduction in physical properties such as tenacity occurs, and a tire-cord having uniform physical properties cannot be obtained.

In more detail, when the drawn fiber having a high fineness and the tire-cord are manufactured using the known spinning equipment, the amount of polymers staying in a spinning chimney is increased to generate non-uniform cooling between inner and outer layers, and thus it is difficult to produce a drawn fiber having uniform physical properties and monofilaments with an uniform cross-sectional area and a tire-cord, and the fineness of monofilaments is increased to increase a discharge speed of the melt in the spinneret, and thus it is difficult to provide sufficient spinning draft. Thus, an orientation difference occurs due to the larger cooling difference between inner and outer layers of monofilaments so as to reduce tenacity, and dimensional stability is also reduced due to the low spinning draft, resulting in unsatisfactory characteristics of tire-cord.

In order to solve the problems, it was previously considered or applied that an undrawn fiber having low fineness was produced using the ultra high-speed spinning technique, followed by twisting during the drawing process. However, this twisting method requires high production costs, and tenacity is damaged by friction due to twisting, and thus there are many difficulties in productivity improvement in manufacturing of a fiber with a thick fineness and sufficient tenacity.

Recently, as the use of RADIAL tire is increased because of the above problems, it is required to provide a tire-cord having a large fineness and excellent and uniform physical properties, but satisfactory progress has not been achieved yet. Thus, there is a need to develop a technique for effectively manufacturing a poly(ethylene terephthalate) drawn fiber having superior strength, dimensional stability and uniform physical properties and having a high fineness of 2000 denier or more without breakage or deterioration in physical properties during the manufacturing process, and a tire-cord.

Furthermore, poly(ethylene terephthalate) having a high I.V. has been generally used as a method for increasing the tenacity of the poly(ethylene terephthalate) drawn fibers. When the intrinsic viscosity of the polymer is raised, the spinning tension increases, and the orientation of the undrawn fiber and the formation of tie-chains connecting crystals increase. Thus, the manufactured drawn fiber can show superior tenacity, and a tire-cord manufactured using the drawn fiber can also show superior tenacity. However, as the intrinsic viscosity of the polymer is increased, a large difference in intrinsic viscosities between the inner and outer layers of the polymer chip is generated. Therefore, the spinnability deteriorates due to the heterogeneity of the viscosity, and the increased intrinsic viscosity of the polymer increases the melt viscosity of the polymer, which increases discharge pressure in the spinneret during spinning, leading to deterioration in spinnability and productivity. In order to solve these problems, a method of reducing the melt viscosity by increasing spinning temperature has been used, but reduction of polymerization degree is generated due to thermal degradation and hydrolysis of the polymer, and thus it is difficult to achieve high tenacity. To solve this problem, addition of various lubricants or viscosity-reducing agents has been also suggested. An example of the former is stearic acid, but its addition to a resin has a disadvantage of reducing the melt viscosity and molecular weight at the same time. An example of the latter is a polycarbonate-based amide compound, but at least several % of viscosity-reducing agent should be added in order to obtain a fiber having high tenacity through sufficient effect of the viscosity-reducing agent. Thus, it is economically unfavorable, and the presence of residues is increased by partial agglomeration and poor dispersion of the viscosity-reducing agent, resulting in deterioration of tensile property and processability.

DISCLOSURE

Technical Problem

Accordingly, the present invention provides a method for manufacturing a poly(ethylene terephthalate) drawn fiber, which is able to effectively manufacture a poly(ethylene terephthalate) drawn fiber showing superior strength, dimensional stability, and uniform physical properties and having a high fineness of 2000 denier or more.

Further, the present invention provides a poly(ethylene terephthalate) drawn fiber obtained by the manufacturing method.

Furthermore, the present invention provides a poly(ethylene terephthalate) tire-cord showing superior strength, uniform physical properties, and superior dimensional stability and having a high fineness, and a manufacturing method thereof.

Technical Solution

The present invention provides a method for manufacturing a poly(ethylene terephthalate) drawn fiber, comprising the steps of melt-spinning a poly(ethylene terephthalate) polymer, which is prepared by adding 0.1 to 2.0 wt % of a polyamide-based resin to a polymer including 90 mol % or more of poly(ethylene terephthalate) and having an intrinsic viscosity of 0.8 to 1.5, through a spinneret at a speed of 2500 to 4000 m/min in a three- or four-ply spinning manner so as to produce an undrawn fiber having a fineness of 2000 denier or more; and drawing the undrawn fiber with a drawing ratio of 1.4 to 2.4.

Further, the present invention provides a poly(ethylene terephthalate) drawn fiber having a tensile strength of 9.5 g/d or more, an intermediate elongation of 4.5 to 6.5% and a breaking elongation of 12.0 to 20.0% under a load of 4.5 g/d, coefficient of variation (C.V.) of 8% or less in the sectional area, and a fineness of 2000 to 6000 denier (d).

Further, the present invention provides a method for manufacturing a poly(ethylene terephthalate) tire-cord, comprising the steps of producing a poly(ethylene terephthalate) drawn fiber by the above described method; twisting the drawn fibers; and dipping the twisted fibers in an adhesive solution, followed by heat treatment.

Further, the present invention provides a poly(ethylene terephthalate) tire-cord having a total fineness of 4000 to 12000 denier, a tensile strength of 8.5 g/de or more, and an E-S index of 5.5 to 7.5%, which is the sum of a dry heat shrinkage ratio after heat treatment in a 177° C. oven for 2 minutes under a load of 0.01 g/de and an intermediate elongation under a load of 2.25 g/de.

Advantageous Effects

According to the present invention, a tire-cord showing superior dimensional stability and tenacity and uniform physical properties while having high fineness, and a manufacturing method thereof can be provided. The tire-cord can be preferably used as a body ply cord for a pneumatic tire, thereby improving steerability and riding comfort of the vehicle.

DESCRIPTION OF DRAWINGS

FIG. 1 is a partial cut-away perspective view illustrating a structure of a general tire.

BEST MODE

Hereinafter, a method for manufacturing a poly(ethylene terephthalate) drawn fiber, a method for manufacturing a tire-cord, a drawn fiber and a tire-cord obtained therefrom will be described according to the specific embodiments of the present invention. However, since the embodiments are provided as examples of the present invention, the scope of the right of the present invention is not limited to and it is obvious to a person skilled in the related art that various modifications of the embodiments are possible within the scope of the right of the present invention.

In addition, the term 'include' or 'comprise' means that include any component (or any element) without particular limitations unless otherwise mentioned in the present entire disclosure, and it cannot be interpreted as it excludes the addition of the other components (or elements).

The poly(ethylene terephthalate) (hereinafter, referred to as 'PET') tire-cord may be produced by melt-spinning the polymer PET to produce an undrawn fiber, drawing the undrawn fiber to obtain a drawn fiber, twisting the PET drawn fibers, and dipping them into the adhesive to produce the PET tire cord in a dip cord type. Therefore, the properties of the undrawn fiber produced by the melt-spinning of the PET and the drawn fiber produced by drawing the same are directly or indirectly reflected to the properties of the PET tire cord.

The present inventors have made many studies on the drawn fiber for tire-cord, and they found that an ultra high-speed spinning technique, together with a three- or four-ply spinning method, is applied so as to effectively manufacture a PET drawn fiber and a tire-cord having superior strength, dimensional stability, and uniform physical properties and having a high fineness, while minimizing breakage or deterioration of physical properties during the manufacturing process, thereby completing the present invention. When the three- or four-ply spinning method is applied, the discharge amount of the polymer to be cooled is relatively low, and thus it is possible to achieve uniform cooling of the entire polymer discharge and to greatly improve the cooling efficiency, even though the ultra high-speed spinning technique is applied. Therefore, after the cooling process, when the cooled resultants are collected to sequentially form the undrawn fiber and the drawn fiber having high fineness of 2000 denier or more, it is possible to effectively manufacture the PET drawn fiber and the tire-cord having uniform physical properties and sectional area and showing superior strength and dimensional stability resulting from a reflection of the advantages of the ultra high-speed spinning technique, while minimizing deterioration of physical properties such as tenacity.

In contrast, if the one- or two-ply spinning method is applied to manufacture the drawn fiber having high fineness, an excessive amount of the polymer discharge may stay in a spinning chimney and a distance between holes in the spinneret may be reduced, resulting in non-uniform and insufficient cooling. Therefore, differences in physical properties and section area between monofilaments inside and outside the spinneret may be increased. For this reason, it is difficult to produce the PET drawn fiber and the tire-cord having uniform physical properties and sectional area. In addition, if the speed and supply of cooling air is increased in order to solve the problem of the two-ply spinning method, breakage and deterioration of physical properties may occur due to interference between the monofilaments. Thus, it is not preferred. In addition, if spinning of more than 4-ply is performed, it is difficult to improve the production efficiency.

In the application of the above spinning method, a small amount of a polyamide-based resin is added to constitute the polymer as a method of reducing the melt viscosity and increasing tenacity by using a high I.V. polymer. The polymer is prepared by adding 0.1 to 2.0 wt % of a polyamide-based resin to a polymer including 90 mol % or more of poly (ethylene terephthalate) and having an intrinsic viscosity of 0.8 to 1.5 dl/g, based on the weight of poly(ethylene terephthalate). Examples of the polyamide-based resin to be added may include most polyamide-based resins such as nylon 6, nylon 66, etc. In this regard, if the addition amount of the polyamide-based resin is less than 0.1 wt %, addition effects cannot be obtained. If the addition amount of the polyamide-based resin is 2 wt % or more, the polyamide-based resin may act as a defect of the drawn fiber to reduce the tenacity of the drawn fiber.

Considering the above described matters, it was demonstrated that the after-mentioned manufacturing method is applied to obtain the PET drawn fiber and the tire-cord having a high fineness of 2000 denier or more, showing superior strength and dimensional stability, and having uniform physical properties and sectional area. The PET tire-cord can be very preferably used as a body ply cord for a pneumatic tire, and in particular, it meets the requirement in the art for the tire-cord having superior physical properties and high fineness.

According to one embodiment of the present invention, therefore, a manufacturing method of the PET drawn fiber is provided.

The present invention may include the steps of melt-spinning a poly(ethylene terephthalate) polymer, which is prepared by adding 0.1 to 2.0 wt % of a polyamide-based resin to a polymer including 90 mol % or more of poly(ethylene terephthalate) and having an intrinsic viscosity of 0.8 to 1.5 dl/g, through a spinneret at a speed of 2500 to 4000 m/min in a three- or four-ply spinning manner so as to produce an undrawn fiber having a fineness of 2000 denier or more; and drawing the undrawn fiber with a drawing ratio of 1.4 to 2.4.

Hereinafter, each step of the manufacturing method of the PET drawn fiber will be described in detail.

In the manufacturing method, melt-spinning of the poly (ethylene terephthalate) polymer, which is prepared by adding 0.1 to 2.0 wt % of the polyamide-based resin to the polymer having an intrinsic viscosity of 0.8 to 1.5 dl/g, is first performed in a three- or four-ply spinning manner so as to produce the undrawn fiber having a fineness of 2000 denier, and preferably 2000 to 6000 denier.

In this step of manufacturing the undrawn fiber, as the ultra high-speed spinning technique is employed, the undrawn fiber having high crystallinity can be obtained, and thus the tire-cord showing superior tenacity and dimensional stability can be manufactured through the subsequent process. In order to achieve high crystallinity of the undrawn fiber, the melt-spinning of the polymer is performed under a spinning speed of 2500 to 4000 m/min, and preferably 3500 to 4000 m/min. That is, in order to achieve the physical properties such as high crystallinity or productivity of the undrawn fiber, it is preferable that the spinning speed of 2500 m/min or higher is applied, and in order to provide a minimum cooling time required for the production of the undrawn fiber, it is preferable that the spinning speed of 4000 m/min or lower is applied.

In addition, the melting spinning of the polymer is preferably performed under a spinning tension of 0.3 to 0.8 g/d. That is, in order to obtain the physical properties of the undrawn fiber which are required in the present invention, for example, high crystallinity, it is preferable that the spinning tension is 0.3 g/d or more, and in order to prevent breakage of the filament or reduction in the physical properties due to unnecessary high tension, it is preferable that the spinning tension is 0.8 g/d or less.

In order to manufacture the undrawn fiber under the above described spinning speed and spinning tension, the PET polymer may have an intrinsic viscosity of 0.8 to 1.5 dl/g, and preferably 1.2 to 1.5 dl/g. The tenacity of the drawn fiber and tire-cord can be more improved by using the polymer having a relatively high intrinsic viscosity and applying the ultra-high speed spinning technique. However, in order to prevent breakage due to an excessively increased pressure of a pack upon spinning, it is preferable that a polymer having an intrinsic viscosity of 1.5 dl/g or less is used in the melt spinning.

The method of adding the polyamide-based resin to the poly(ethylene terephthalate) polymer includes blending, side-feeding, and side-feeding after preparation of a master batch chip, but is not limited thereto.

Meanwhile, after melting-spinning the PET polymer under the above described conditions, a cooling process is further performed to manufacture the undrawn fiber, and this cooling process is preferably performed by adding cooling air of 15 to 60° C., and the supply of the cooling air is preferably controlled at 0.4 to 1.5 m/s under the above cooling air temperature conditions.

The undrawn fiber manufactured by the above process may show crystallinity of 10 to 30% and low amorphous orientation factor of 0.08 to 0.2. As the undrawn fiber having these crystalline properties is obtained through the ultra-high speed spinning technique and then the drawn fiber and the tire-cord are manufactured, the tire-cord is able to show superior tenacity and dimensional stability. The technical principle can be inferred as follows.

Basically, the PET polymer constituting the undrawn fiber has a partially crystallized structure, and is composed of crystalline regions and amorphous regions. However, the degree of crystallization of the undrawn fiber obtained under the controlled melt-spinning conditions is higher than that of the known undrawn fiber (typically crystallized less than 7%) because of the oriented crystallization phenomenon, and the crystallinity is 10% or more and preferably 10 to 30%. The drawn fiber and the tire cord prepared from the undrawn fiber can show high shrinkage stress and modulus due to such high crystallinity.

At the same time, the undrawn fiber shows the AOF of 0.2 or less, and preferably 0.08 to 0.2, which is largely lower than that of the known undrawn fiber. The AOF means the degree of orientation of the chains included in the amorphous region of the undrawn fiber, and it has low value as the entanglement of the chains of the amorphous region increases. Generally, the drawn fiber and the tire cord prepared from the undrawn fiber show low shrinkage stress as well as low shrinkage rate, because the degree of disorder increases as the AOF decreases and the chains of the amorphous region becomes not a strained structure but a relaxed structure. However, the undrawn fiber obtained under the above described melt-spinning conditions includes more cross-linking bonds per a unit volume, because the molecular chains constituting the undrawn fiber slip during the spinning process and form a fine network structure. On this account, the undrawn fiber may become the structure of which the chains of the amorphous region are strained in spite of the largely lower AOF value, and thus it shows developed crystalline structure and superior orientation characteristics due to this. Therefore, the drawn fiber and the tire cord, as well as the undrawn fiber, are able to show low shrinkage rate and high shrinkage stress and modulus, and as a result, the tire cord showing superior dimensional stability can be manufactured.

Further, uniform cooling can be obtained by applying the three- or four-ply spinning method together with the above melt-spinning conditions, and thus it is possible to manufacture the high fineness-drawn fiber and the tire-cord having uniform physical properties and sectional area, while minimizing deterioration of physical properties during the manufacturing process, as described above. Such uniform physical properties and section area are attributed to the uniform sectional area of the undrawn fiber resulting from the uniform cooling, and the undrawn fiber produced by the above process may have coefficient of variation (C.V.) of 8% or less, and preferably 7% or less in the sectional area.

Meanwhile, after formation of the above described undrawn fiber, the undrawn fiber is drawn to produce the PET drawn fiber. The drawing step may be performed by Direct Spinning & Drawing (hereinafter, referred to as 'DSD') composed of a single consecutive process of spinning and drawing according to the typical production process of the drawn fiber.

Further, the drawing step is preferably performed at a drawing ratio of 1.4 to 2.4 times. That is, in order to produce the tire-cord having superior tenacity and dimensional stability, the drawing ratio is preferably 1.4 times. The drawing ratio is also preferably 2.4 times or less due to a limitation in the control of the drawing ratio according to the spinning equipment upon performing the ultra-high speed spinning at a spinning speed of 2500 to 4000 m/min.

The drawn fiber produced by the method has a tensile strength of 9.5 g/d or more as it is, an intermediate elongation of 4.5 to 6.5% and a breaking elongation of 12.0 to 20.0% under a load of 4.5 g/d, coefficient of variation (C.V.) of 8% or less and preferably 7% or less in the sectional area, thereby showing superior and uniform physical properties and section area. At the same time, the drawn fiber can be produced to have a high fineness of 2000 to 6000 denier, and it meets the requirement in the art for the tire-cord having superior physical properties and high fineness.

According to another embodiment of the present invention, a method for manufacturing a PET tire-cord using the above described method for manufacturing the PET drawn fiber is provided. The method for manufacturing the PET tire-cord may include the steps of adding the polyamide-based resin to the poly(ethylene terephthalate) polymer by the above descried method; producing the poly(ethylene terephthalate) drawn fiber; twisting the drawn fibers to produce the twisted fibers; and dipping the twisted fiber in an adhesive solution, followed by heat treatment.

In the manufacturing method of the tire-cord, the twisting step may be, for example, performed by 'Z' twisting the drawn fiber having a total fineness of 2000 to 6000 denier at 100 to 400 TPM (twist per meter) and 'S' twisting 1 to 3 'Z' twisted plies at 100 to 400 TPM so as to produce the twisted fiber having a total fineness of 4000 to 12000 denier.

In addition, example of the adhesive solution may include those typically used in the production of tire-cord, for example, Resorcinol-Formaldehyde-Latex (RFL) solution. The heat treatment process may be performed at a temperature of 230 to 260° C. for 90 to 360 seconds, preferably at a temperature of 240 to 250° C. for 90 to 240 seconds, and more preferably at a temperature of 245 to 250° C. for 90 to 120 seconds.

The tire-cord can be manufactured by the above method. However, the individual steps are only an example of the manufacturing method of the tire-cord, and it is apparent that steps typically performed in the art to which the present invention pertains may be further included prior to or after each step.

The tire-cord manufactured by the process may have high fineness of a total fineness of 4000 to 12000 denier and a tensile strength of 8.5 g/de or more, and an E-S index of 5.5 to 7.5%, which is the sum of a dry heat shrinkage ratio after heat treatment in a 177° C. oven for 2 minutes under a load of 0.01 g/de and an intermediate elongation under a load of 2.25 g/de. In this regard, the 'E-S index' is the sum of 'dry heat shrinkage ratio' (177° C. oven for 2 minutes under a load of 0.01 g/de and 'intermediate elongation' (under a load of 2.25 g/de), and as the value is lower, variation in the shape of the tire-cord becomes lower, and the tensile strength becomes superior. The tire-cord can also exhibit the physical properties including the intermediate elongation of 3.5 to 5.5% and the breaking elongation of 15.0% or more and preferably 15.0 to 17.0% under a load of 2.25 g/de.

As such, the tire-cord manufactured by the above described process is able to show superior tensile strength and dimensional stability, and uniform physical properties while having high fineness. Thus, the tire-cord can be very preferably used as a body ply cord for a pneumatic tire, and very effectively support the vehicle's entire load. However, the use of the tire-cord is not limited thereto, and it is obvious that the tire-cord can be used in other applications such as cap ply.

MODE FOR INVENTION

Hereinafter, the preferred Examples are provided for better understanding. However, these Examples are for illustrative purposes only, and the invention is not intended to be limited by these Examples.

Preparation of Drawn Fibers

Examples 1~5

A predetermined amount of a polyamide-based resin nylon 6 was added to a PET polymer chip by side-feeding, and PET undrawn fibers of Examples 1 to 5 were prepared by melt-spinning and cooling the PET polymer chip using a ultra high-speed spinning technique to which a three- or four-ply spinning method is applied. At this time, the spinning conditions are the same as in the following Table 1, and other conditions were in accordance with the typical conditions for the preparation of PET undrawn fibers. In addition, the undrawn fibers were drawn at the predetermined drawing ratio shown in Table 1, followed by heat setting and winding so as to prepare PET drawn fibers.

Comparative Examples 1~5

Unlike in Examples 1 to 5, nylon 6 was added to the PET polymer chip at a content out of the range required, and PET drawn fibers were prepared by melt-spinning and cooling the PET polymer chip using a ultra high-speed spinning technique to which a one- or two-ply spinning method is applied. At this time, the spinning conditions are the same as in the following Table 1.

TABLE 1

| Drawn fiber | Spinning method | Number of spinneret Hole | Drawn fiber (or undrawn fiber) fineness (denier) | Spinning speed (m/min) | Drawing ratio | Content of additive (wt %) |
|---|---|---|---|---|---|---|
| Example 1 | 3-ply | 450 | 2100 | 3200 | 1.8 | 0.5 |
| Example 2 | 3-ply | 450 | 3000 | 3200 | 1.8 | 0.5 |
| Example 3 | 3-ply | 600 | 4000 | 3200 | 1.8 | 0.5 |
| Example 4 | 4-ply | 600 | 4000 | 3200 | 1.8 | 1.0 |
| Example 5 | 4-ply | 600 | 4000 | 3200 | 1.8 | 1.5 |
| Comparative Example 1 | 1-ply | 150 | 3000 | 3200 | 1.8 | 1.0 |
| Comparative Example 2 | 1-ply | 200 | 3000 | 3200 | 1.8 | 1.0 |
| Comparative Example 3 | 2-ply | 300 | 4000 | 3200 | 1.8 | 1.0 |
| Comparative Example 4 | 2-ply | 300 | 4000 | 3200 | 1.8 | 3.0 |
| Comparative Example 5 | 3-ply | 450 | 4000 | 3200 | 1.8 | 3.0 |

[Measurement of Physical Properties of Drawn Fibers]

Physical properties of the drawn fibers according to Examples 1~5 and Comparative Examples 1~5 were measured by the following methods, and the measured physical properties are shown in the following Table 2.

1) Tensile strength (g/de): the strength of the fiber was measured using a universal strength tester in accordance with standard ASTM D885.

2) Intermediate elongation (%) and Breaking elongation (%): the intermediate elongation and breaking elongation were measured under a load of 4.5 g/de using a universal strength tester in accordance with standard ASTM D885.

3) Dry heat shrinkage ratio (%): the dry heat shrinkage ratio was measured in a 177° C. oven for 2 minutes without an initial load using a dry heat shrinkage ratio tester (manufacturer: TESTRITE, model: MK-V).

4) C.V. (%) in sectional area: the sectional area of the fiber was photographed using an Olympus BX51 microscope, and then C.V. in the sectional area was measured using an Analysis Five program.

TABLE 2

| Physical properties of drawn fiber | Tensile strength (g/de) | Intermediate elongation (%) | Breaking elongation (%) | C.V. in Sectional area (%) |
|---|---|---|---|---|
| Example 1 | 9.5 | 4.7 | 16.4 | 4.75 |
| Example 2 | 9.6 | 5.2 | 15.8 | 5.24 |
| Example 3 | 9.6 | 5.0 | 16.1 | 6.17 |
| Example 4 | 9.6 | 5.1 | 15.7 | 5.31 |
| Example 5 | 9.7 | 5.0 | 16.0 | 5.22 |
| Comparative Example 1 | 8.7 | 9.2 | 18.8 | 16.77 |
| Comparative Example 2 | 8.6 | 8.4 | 17.8 | 16.51 |
| Comparative Example 3 | 9.0 | 8.2 | 17.1 | 13.21 |
| Comparative Example 4 | 8.6 | 7.5 | 16.9 | 12.02 |
| Comparative Example 5 | 9.2 | 7.1 | 16.2 | 6.76 |

As shown in Tables 1 and 2, the drawn fibers of 2000 denier or more of Comparative Examples 1 to 4 prepared by the one- or two-ply spinning method showed poor tensile strength, which is likely to be attributed to deterioration in physical properties such as tensile strength and intermediate elongation due to non-uniform cooling. In addition, breakage due to non-uniform C.V. in the section area occurred, leading to deterioration in processability, and non-uniform physical properties. The results of Comparative Examples 4 to 5 showed that the excessive addition of nylon 6 generated frequent breakage and a great reduction in fiber quality, leading to a reduction in strength.

In contrast, the fibers of Examples 1 to 5 showed superior physical properties such as tensile strength, intermediate elongation, breaking elongation, etc. and uniform physical properties and sectional area.

Manufacture of Tire-Cords

Examples 6~10

A PET tire-cord was manufactured by 'Z-twisting' the drawn fibers of any one of Examples 1 to 5 to have a predetermined total fineness and twist per meter (TPM), 'S-twisting' 2 plies of the Z twisted fibers with the same twisting level, dipping in an RFL adhesive solution, and drying and heat-treating the same. In this regard, the used drawn fiber, drawn fiber fineness, Twist Multiplier (TM) and heat treatment conditions for the cord are the same as in the following Table 3, and the composition of the RFL adhesive solution and drying conditions were in accordance with the typical conditions for the manufacture of PET tire-cord.

Comparative Examples 6~10

PET tire-cords were manufactured using the drawn fibers prepared under the conditions of Comparative Examples 1 to 5. In this regard, the used drawn fiber, drawn fiber fineness, Twist Multiplier (TM) and heat treatment conditions for the cord are the same as in the following Table 3.

TABLE 3

| Manufacture of cord | Drawn fiber used | Drawn fiber fineness (denier) | Twist Multiplier (TM) | Ply | Heat treatment conditions for cord |
|---|---|---|---|---|---|
| Example 6 | Example 1 | 2100 | 13.9 | 2 | 245~260° C., 90 sec or more |
| Example 7 | Example 2 | 3000 | 13.9 | 2 | 245~260° C., 90 sec or more |
| Example 8 | Example 3 | 4000 | 13.9 | 2 | 245~260° C., 90 sec or more |

TABLE 3-continued

| Manufacture of cord | Drawn fiber used | Drawn fiber fineness (denier) | Twist Multiplier (TM) | Ply | Heat treatment conditions for cord |
|---|---|---|---|---|---|
| Example 9 | Example 4 | 4000 | 13.9 | 2 | 245~260° C., 90 sec or more |
| Example 10 | Example 5 | 4000 | 13.9 | 2 | 245~260° C., 90 sec or more |
| Comparative Example 6 | Comparative Example 1 | 3000 | 13.9 | 2 | 245~260° C., 90 sec or more |
| Comparative Example 7 | Comparative Example 2 | 3000 | 13.9 | 2 | 245~260° C., 90 sec or more |
| Comparative Example 8 | Comparative Example 3 | 4000 | 13.9 | 2 | 245~260° C., 90 sec or more |
| Comparative Example 9 | Comparative Example 4 | 4000 | 13.9 | 2 | 245~260° C., 90 sec or more |
| Comparative Example 10 | Comparative Example 5 | 4000 | 13.9 | 2 | 245~260° C., 90 sec or more |

[Measurement of Physical Properties of Tire-Cord]

Physical properties of the tire-cords according to Examples 6~10 and Comparative Examples 6~10 were measured by the following methods, and the measured physical properties are shown in the following Table 4.

1) Tensile strength (g/de): the strength of the cord was measured using a universal strength tester in accordance with standard ASTM D885.

2) Intermediate elongation (%) and Breaking elongation (%): the intermediate elongation and breaking elongation were measured under a load of 2.25 g/de using a universal strength tester in accordance with standard ASTM D885.

3) Dry heat shrinkage ratio (%): the dry heat shrinkage ratio was measured in a 177° C. oven for 2 minutes under a load of 0.01 g/de using a dry heat shrinkage ratio tester (manufacturer: TESTRITE, model: MK-V).

4) E-S index: the sum of the intermediate elongation and the dry heat shrinkage ratio measured by the method.

TABLE 4

| Physical properties of cord | Tensile strength (g/de) | Intermediate elongation (%) | Breaking elongation (%) | Dry heat shrinkage ratio (%) | ES Index (%) |
|---|---|---|---|---|---|
| Example 6 | 8.55 | 4.0 | 15.3 | 2.6 | 6.5 |
| Example 7 | 8.64 | 4.0 | 15.7 | 2.9 | 6.9 |
| Example 8 | 8.60 | 4.0 | 16.1 | 2.7 | 6.7 |
| Example 9 | 8.61 | 4.0 | 16.5 | 3.0 | 7.0 |
| Example 10 | 8.73 | 4.1 | 16.3 | 2.6 | 6.7 |
| Comparative Example 6 | 7.83 | 4.1 | 13.9 | 5.9 | 10.0 |
| Comparative Example 7 | 7.74 | 4.0 | 16.3 | 5.5 | 9.5 |
| Comparative Example 8 | 8.10 | 4.1 | 13.1 | 5.2 | 9.3 |
| Comparative Example 9 | 7.72 | 4.0 | 14.4 | 4.9 | 8.9 |
| Comparative Example 10 | 8.28 | 4.1 | 15.7 | 4.6 | 8.7 |

As shown in Tables 3 and 4, the cords of Comparative Examples 6 to 10 which were manufactured using the drawn fibers prepared by the one- or two-ply spinning method showed the tensile strength or breaking elongation and the E-S index out of the preferred range.

In contrast, as the cords of Examples 6 to 10 were manufactured using the drawn fibers according to Examples 1 to 5, they showed superior physical properties including tensile strength, breaking elongation, intermediate elongation, dry heat shrinkage ratio, and E-S index within the preferred range.

The invention claimed is:

1. A method for manufacturing a poly(ethylene terephthalate) drawn fiber, comprising the steps of:
    adding a polyamide-based resin to a polymer including 90 mol % or more of poly(ethylene terephthalate), wherein the polyamide-base resin is added in an amount of 0.1 to 2.0 wt % based on the weight of the poly(ethylene terephthalate);
    melt-spinning the polyamide-based resin-added polymer mixture through a spinneret at a speed of 2500 to 4000 m/min in a three- or four-ply spinning manner so as to produce an undrawn fiber having a fineness of 2000 denier or more; and
    drawing the undrawn fiber with a drawing ratio of 1.4 to 2.4,
    wherein the polymer including 90 mol % or more of poly(ethylene terephthalate) has an intrinsic viscosity of 0.8 to 1.5, and
    wherein the polyamide-based resin includes nylon 6 or nylon 66.

2. The method according to claim 1, wherein the melt-spinning process is performed under a spinning tension of 0.3 to 0.8 g/d.

3. The method according to claim 1, wherein the undrawn fiber has crystallinity of 10 to 30% and coefficient of variation of 8% or less in the sectional area.

\* \* \* \* \*